United States Patent
Wang et al.

(10) Patent No.: US 11,480,829 B2
(45) Date of Patent: Oct. 25, 2022

(54) ARRAY SUBSTRATE, METHOD FOR MANUFACTURING ARRAY SUBSTRATE, AND DISPLAY DEVICE

(71) Applicants: Beihai HKC Optoelectronics Technology Co., Ltd., Beihai (CN); HKC Corporation Limited, Shenzhen (CN)

(72) Inventors: Xiaodong Wang, Shenzhen (CN); Peixin Lin, Shenzhen (CN); Lidan Ye, Shenzhen (CN)

(73) Assignees: Beihai HKC Optoelectronics Technology Co., Ltd., Beihai (CN); HKC Corporation Limited, Shenzhen (CN)

( * ) Notice: Subject to any disclaimer, the term of this patent is extended or adjusted under 35 U.S.C. 154(b) by 0 days.

(21) Appl. No.: 17/358,304

(22) Filed: Jun. 25, 2021

(65) Prior Publication Data
US 2022/0091450 A1    Mar. 24, 2022

(51) Int. Cl.
*G02F 1/1339*    (2006.01)
*G02F 1/1343*    (2006.01)
*G02F 1/1368*    (2006.01)

(52) U.S. Cl.
CPC ........ *G02F 1/1339* (2013.01); *G02F 1/13439* (2013.01); *G02F 1/134318* (2021.01); *G02F 1/1368* (2013.01)

(58) Field of Classification Search
CPC .......... G02F 1/134318; G02F 1/13439; G02F 1/1368; G02F 1/1339
See application file for complete search history.

(56) References Cited

U.S. PATENT DOCUMENTS

| | | | |
|---|---|---|---|
| 2018/0210245 A1* | 7/2018 | Yao | C09J 11/04 |
| 2020/0110295 A1* | 4/2020 | Huang | G02F 1/134309 |

* cited by examiner

*Primary Examiner* — James A Dudek
(74) *Attorney, Agent, or Firm* — Seyfarth Shaw LLP

(57) ABSTRACT

An array substrate, a method for manufacturing an array substrate, and a display device are provided. The array substrate includes a first substrate, a first common electrode layer, a second common electrode layer, a frame sealing adhesive and a conductive adhesive. The first common electrode layer is disposed at an edge of the first substrate and is in a grid shape; the second common electrode layer is disposed at an inner side the first common electrode layer, and includes a light-transmitting portion provided in a grid shape, and a gate insulating layer is provided on the light-transmitting portion. The frame sealing adhesive is disposed on the first common electrode layer. The conductive adhesive is disposed in the frame sealing adhesive and partially extends onto the gate insulating layer corresponding to the light-transmitting portion. The conductive adhesive is configured to electrically connect with a common electrode of a color filter substrate.

15 Claims, 3 Drawing Sheets

ARRAY SUBSTRATE, METHOD FOR MANUFACTURING ARRAY SUBSTRATE, AND DISPLAY DEVICE

CROSS REFERENCE TO RELATED APPLICATIONS

The application claims priority to Chinese Patent Application No. 2020110114451, filed on Sep. 23, 2020, which is incorporated herein by reference in its entirety.

TECHNICAL FIELD

The present application relates to a field of display technology, and more particularly, to an array substrate, a method for manufacturing an array substrate and a display device.

BACKGROUND

The liquid crystal display controls light penetrating through a liquid crystal layer by controlling a rotation direction and a rotation angle of a liquid crystal molecule, and thus displays images of various grayscales. The liquid crystal display has advantages of high image quality, small volume, light weight or the like, and is widely used in products such as a mobile phone, a laptop computer, a television, a display or the like.

The liquid crystal display includes an array substrate and a color filter substrate assembled by a frame sealing adhesive. The frame sealing adhesive is generally cured by a light source disposed on a back side of the array substrate and the color filter substrate. The frame sealing adhesive is provided with a conductive adhesive electrically connecting the array substrate and the color filter substrate. When the array substrate and the color filter substrate are press-fitted, the conductive adhesive will extend to a region other than a common electrode layer in a grid shape. Since a common electrode layer corresponding to that region cannot transmit light, a curing effect of the conductive adhesive in that region is poor, and thus conductive performance is affected.

SUMMARY

Based on the above, it is necessary to provide an array substrate, a method for manufacturing an array substrate, and a display device for a problem that a conductive adhesive extends to a region of a common electrode layer that cannot transmit light, and a curing effect of the conductive adhesive in that region is poor, and thus conductive performance is affected.

An array substrate is provided, including: a first substrate; a first common electrode layer in a grid shape disposed at an edge of the first substrate; a second common electrode layer disposed at an inner side of the first common electrode layer, including a light-transmitting portion in a grid shape, a gate insulating layer being provided on the light-transmitting portion; a frame sealing adhesive disposed on the first common electrode layer; and a conductive adhesive provided in the frame sealing adhesive and extending partially onto the gate insulating layer corresponding to the light-transmitting portion, the conductive adhesive being configured to electrically connect with a common electrode of a color filter substrate.

A display device is further provided, including a color filter substrate and the array substrate mentioned above.

A method of manufacturing an array substrate is further provided. The array substrate includes a first substrate. The method includes: forming a first common electrode layer and a second common electrode layer on the first substrate respectively, wherein the first common electrode layer is in a grid shape, and the second common electrode layer includes a light-transmitting portion in a grid shape; forming a gate insulating layer on the first common electrode layer and the second common electrode layer, wherein the first common electrode layer includes a contact portion exposed from the gate insulating layer; forming a passivation layer on the gate insulating layer and forming a first conductive layer on the contact portion; coating a frame sealing adhesive on a region of the passivation layer corresponding to the first common electrode layer; injecting a conductive adhesive into a region of the frame sealing adhesive corresponding to the contact portion, and extending a part of the conductive adhesive onto the gate insulating layer corresponding to the light-transmitting portion.

According to the above array substrate, the method for manufacturing the array substrate, and the display device, by providing the light-transmitting portion in a grid shape in the second common electrode layer, the conductive adhesive extending onto the gate insulating layer corresponding to the light-transmitting portion can receive light and thus be cured, and the curing effect is good.

DETAILED DESCRIPTION

For ease of understanding of the present application, the present application will be described more fully hereinafter with reference to the accompanying drawings. Preferred embodiments of the present application are given in the accompanying drawings. However, the present application may be implemented in many different forms and is not limited to the embodiments described herein. On the contrary, the purpose of providing these embodiments is to make a more thorough understanding of the disclosure of the present application.

It should be noted that when an element is referred to as being "fixed to" another element, it may be directly on the other element or there may also be an intermediate element. When an element is considered to be "connected" to another element, it may be directly connected to the other element or there may be an intermediate element at the same time. As used herein, the terms "vertical", "horizontal", "left", "right", and similar expressions are for purposes of illustration only and do not mean the unique embodiment.

Unless defined otherwise, all technical and scientific terms used herein have the same meaning as commonly understood by those skilled in the art to which this application belongs. The terms used herein in the description of the present application are for the purpose of describing particular embodiments only and are not intended to be limiting of the present application.

Figure 1:
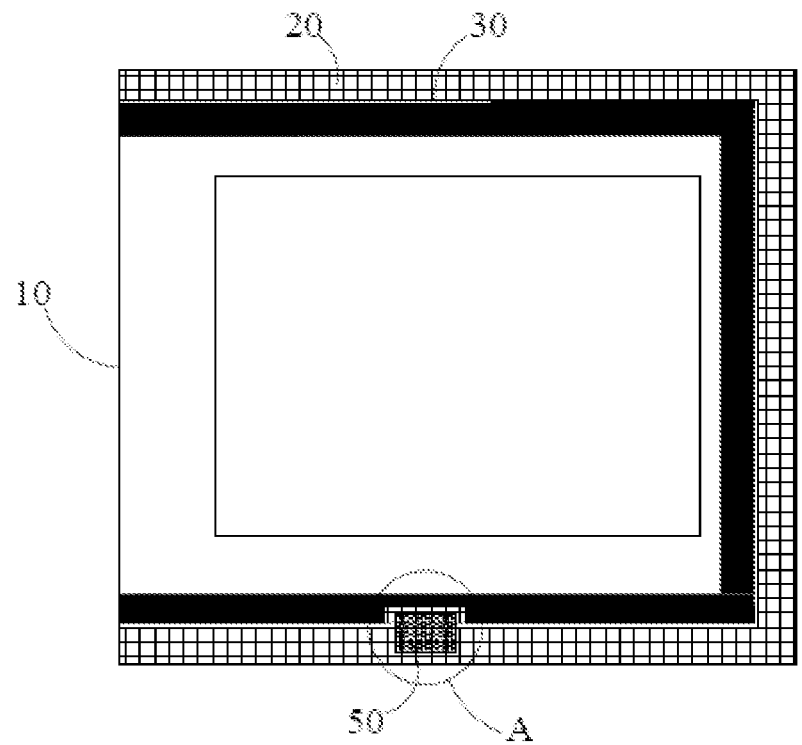
FIG. 1 is a structural schematic diagram of an array substrate according to an embodiment.
Figure 3:
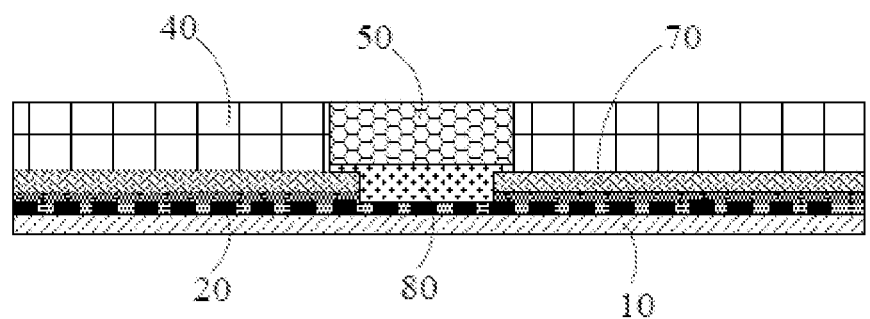
FIG. 3 is a sectional view of the region A taken along b1-b2 shown in FIG. 2.

Please refer to FIGS. 1 and 3, it is a structural schematic diagram of an array substrate provided by an embodiment of the present application. The array substrate includes a first substrate 10, a first common electrode layer 20, a second common electrode layer 30, a frame sealing adhesive 40 and a conductive adhesive 50.

The first substrate 10 may be a transparent substrate, and may specifically be a substrate made of a transparent material having a certain firmness such as glass or transparent resin or the like.

The first common electrode layer 20 is disposed at an edge of the first substrate 10 in a grid shape. Specifically, the first substrate 10 includes a display region and a non-display region surrounding the display region. The display region is used for displaying a picture. The non-display region is a light-shielding region for preventing backlight of a backlight module from transmitting out of the non-display region, so as to ensure a display effect of a liquid crystal display panel. The first common electrode layer 20 is disposed in the non-display region of the first substrate 10. The first common electrode layer 20 may be made of metal such as tungsten, titanium, molybdenum, aluminum, neodymium, an alloy of aluminum nickel, an alloy of molybdenum tungsten, chromium or copper, etc., or a combination of the foregoing materials.

The first common electrode layer 20 is configured to transmit a common electrode voltage received by the array substrate to a common electrode of a color filter substrate.

Figure 2:
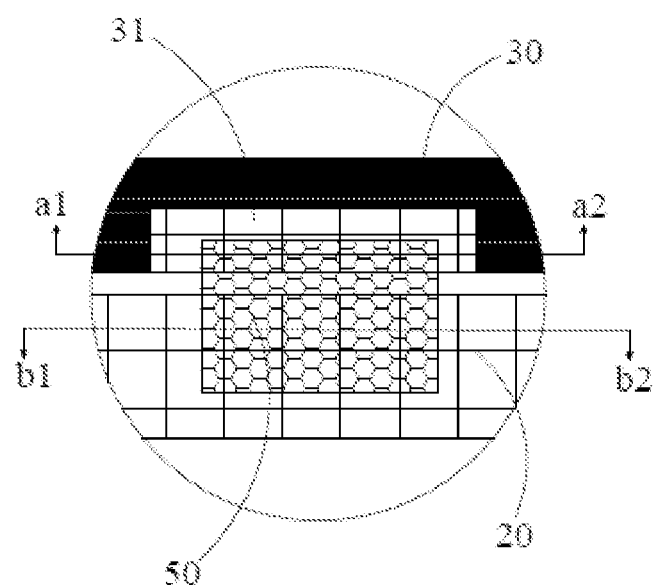
FIG. 2 is an enlarged view of a region A shown in FIG. 1.

Please refer to FIG. 2, the second common electrode layer 30 is disposed at an inner side the first common electrode layer 20. The second common electrode layer 30 includes a light-transmitting portion 31 in a grid shape, and a gate insulating layer 60 is arranged on the light-transmitting portion 31. The second common electrode layer 30 may be made of a metal such as tungsten, titanium, molybdenum, aluminum, neodymium, an alloy of aluminum nickel, an alloy of molybdenum tungsten, chromium or copper, etc., or a combination of the foregoing materials. The second common electrode layer 30 is configured to transmit a common electrode voltage received by the array substrate from the outside to a common electrode of the array substrate.

It should be noted that the first common electrode layer 20 is in a grid shape, that is, the first common electrode layer 20 is provided with a plurality of first through holes with uniform intervals. The light-transmitting portion 31 is in a grid shape, that is, the light-transmitting portion 31 is provided with a plurality of second through holes with uniform intervals. The light can irradiate the frame sealing adhesive 40 through the first through holes, and can also irradiate the conductive adhesive 50 located on the light-transmitting portion 31 through the second through holes.

An area of the light-transmitting portion 31 is greater than or equal to an area of the conductive adhesive 50 on the gate insulating layer 60.

Please refer to FIG. 1 again, the frame sealing adhesive 40 is disposed on the first common electrode layer 20. The frame sealing adhesive 40 is configured to bond the array substrate and the color filter substrate. In the present embodiment, the frame sealing adhesive 40 is an ultraviolet curing adhesive.

The conductive adhesive 50 is provided in the frame sealing adhesive 40 and partially extends onto the gate insulating layer 60 corresponding to the light-transmitting portion 31, and the conductive adhesive 50 is configured to electrically connect with the common electrode of the color filter substrate. The first common electrode layer 20 transmits the common electrode voltage received by the array substrate to the common electrode of the color filter substrate through the conductive adhesive 50.

The conductive adhesive 50 has conductive particles and has an adhesive ability. The conductive adhesive 50 forms a conductive strip or a conductive ball.

In an embodiment, the first common electrode layer 20 and the second common electrode layer 30 are disposed along at least three sides of the first substrate 10. Thus, the light can pass through the first common electrode layer 20 to cure the frame sealing adhesive 40.

Figure 4:
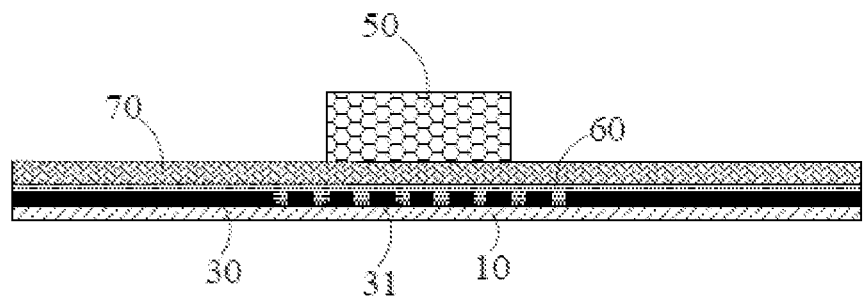
FIG. 4 is a sectional view of the region A taken along a1-a2 shown in FIG. 2.

Please refer to FIG. 4, in an embodiment, a passivation layer 70 is further included between the light-transmitting portion 31 and the conductive adhesive 50. The gate insulating layer 60 is formed on the second common electrode layer 30, and the passivation layer 70 is formed on the gate insulating layer 60. Forming the gate insulating layer 60 and the passivation layer 70 sequentially on the second common electrode layer 30 can effectively isolate and insulate the second common electrode layer 30 from the conductive adhesive 50.

Please refer to FIG. 3, in an embodiment, a first conductive layer 80 is further formed between the first common electrode layer 20 and the conductive adhesive 50, and the conductive adhesive 50 is electrically connected to the first common electrode layer 20 through the first conductive layer 80. Thus, it is achieved that the common electrode voltage is transmitted from the first common electrode layer 20 to the conductive adhesive 50 through the first conductive layer 80.

In an embodiment, the first conductive layer 80 is an indium tin oxide layer. Since indium tin oxide is required in a manufacturing process of the array substrate, using the indium tin oxide as the material of the first conductive layer 80 makes the material of the first conductive layer 80 easy to obtain, and a cost is low.

In an embodiment, a cross section of the first common electrode layer 20 is in a gear shape, and a cross section of a side of the first conductive layer 80 contacting the first common electrode layer 20 is in a gear shape matching the first common electrode layer 20. The cross section of the side of the first conductive layer 80 contacting the first common electrode layer 20 is provided in a gear shape matching the first common electrode layer 20, so that a contact area between the first conductive layer 80 and the first common electrode layer 20 can be increased, and a contact resistance can be reduced. In other embodiments, the cross section of the side of the first conductive layer 80 contacting the first common electrode layer 20 may be provided as a plane or in other structure. When the cross section of the side of the first conductive layer 80 contacting the first common electrode layer 20 is provided as a plane, a grid of the first common electrode layer 20 may be filled with the gate insulating layer 60.

In an embodiment, the gate insulating layer 60 and the passivation layer 70 are included between the first common electrode layer 20 and the frame sealing adhesive 40. The gate insulating layer 60 is formed on the first common electrode layer 20, and the passivation layer 70 is formed on the gate insulating layer 60. Forming the gate insulating layer 60 and the passivation layer 70 sequentially on the first common electrode layer 20 can effectively isolate and insulate the first common electrode layer 20 from other conductive portions of the array substrate, thereby avoiding short-circuiting with the other conductive portions of the array substrate.

A gate line and a data line intersecting each other are further formed on the array substrate. A thin film transistor is formed at an intersection, and a pixel electrode is connected to the thin film transistor.

According to the array substrate of the present application, by providing the light-transmitting portion 31 in a grid shape in the second common electrode layer 30, the conductive adhesive 50 extending onto the gate insulating layer 60 corresponding to the light-transmitting portion 31 can receive light and thus be cured, and the curing effect is good.

Figure 5:
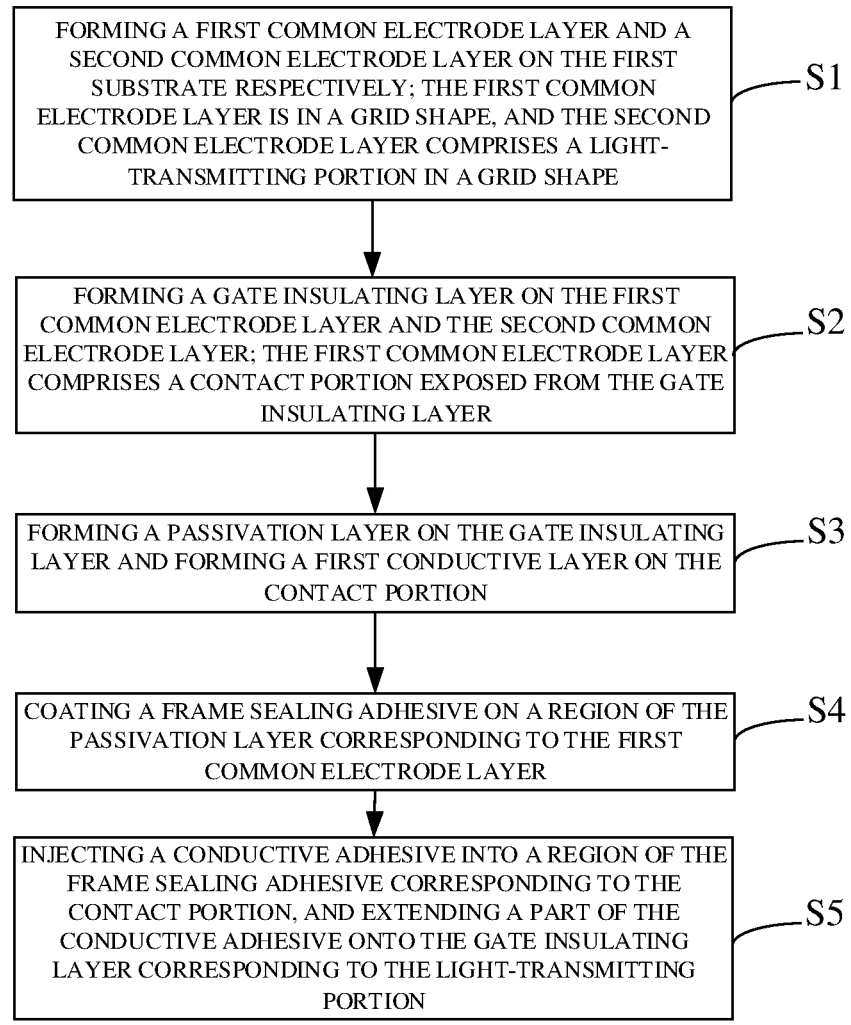
FIG. 5 is a flowchart of a method of manufacturing an array substrate according to an embodiment.

Please refer to FIG. 5, the present application further provides a method for manufacturing an array substrate. The array substrate includes a first substrate 10. The first substrate 10 may be a transparent substrate, and may specifically be a substrate made of a transparent material having certain firmness such as glass or transparent resin or the like. The method includes the following steps.

In step S1, a first common electrode layer 20 and a second common electrode layer 30 are respectively formed on the first substrate 10. The first common electrode layer 20 is in a grid shape, and the second common electrode layer 30 includes a light-transmitting portion 31 in a grid shape.

The first common electrode layer 20 and the second common electrode layer 30 may be made of metal such as tungsten, titanium, molybdenum, aluminum, neodymium, an alloy of aluminum nickel, an alloy of molybdenum tungsten, chromium or copper, etc., or a combination of the foregoing materials.

Specifically, the first common electrode layer 20 and the second common electrode layer 30 may be formed on the first substrate 10 by coating, depositing, sputtering or the like. Then, the first common electrode layer 20 and the second common electrode layer 30 are exposed, developed, etched, and photoresist stripped by using a mask with a specific pattern, so that the first common electrode layer 20 is in a grid shape. The second common electrode layer 30 includes a light-transmitting portion 31 in a grid shape.

In step S2, a gate insulating layer 60 is formed on the first common electrode layer 20 and the second common electrode layer 30. The first common electrode layer 20 includes a contact portion exposed to the gate insulating layer 60.

The gate insulating layer 60 may be formed on a surface of the first common electrode layer 20 and the second common electrode layer 30 by coating, depositing, sputtering or the like. For example, a layer of organic resin material having a certain thickness is coated on the surface of the first common electrode layer 20 and the second common electrode layer 30 to form the gate insulating layer 60. Then, the contact portion exposed from the gate insulating layer 60 is fabricated on the first common electrode layer 20 on which the gate insulating layer 60 is formed.

The gate insulating layer 60 may be formed by using an oxide, a nitride, or an oxynitride compound, and the corresponding reaction gas may be a mixed gas of $SiH_4$, $NH_3$, and $N_2$ or a mixed gas of $SiH_2Cl_2$, $NH_3$, and $N_2$.

A grid of the contact portion may be filled with the gate insulating layer 60, or may not be filled with the gate insulating layer 60.

In step S3, a passivation layer 70 is formed on the gate insulating layer 60 and a first conductive layer 80 is formed on the contact portion.

The passivation layer 70 may be formed on the gate insulating layer 60 by coating, depositing, sputtering or the like. For example, a layer of silicide having a certain thickness is sputtered on a surface of the gate insulating layer 60 to form the passivation layer 70.

The passivation layer 70 may be formed by using an oxide, a nitride or an oxynitride compound, and the corresponding reaction gas may be a mixed gas of $SiH_4$, $NH_3$ and $N_2$ or a mixed gas of $SiH_2Cl_2$, $NH_3$ and $N_2$.

The contact portion is electrically connected to the first conductive layer 80. The first conductive layer 80 may be made of indium tin oxide. The cross section of the contact portion is in a gear shape, and the cross section of a side of the first conductive layer 80 contacting the first common electrode layer 20 is provided in a gear shape matching the first common electrode layer 20, thereby increasing the contact area between the first conductive layer 80 and the first common electrode layer 20 and reducing the contact resistance. The cross section of the side of the first conductive layer 80 contacting the first common electrode layer 20 may also be provided as a plane or in other structure. When the cross section of the side of the first conductive layer 80 contacting the contact portion is provided as a plane, the grid of the contact portion may be filled with the gate insulating layer 60.

In step S4, a frame sealing adhesive 40 is coated a region of the passivation layer 70 corresponding to the first common electrode layer 20.

In step S5, a conductive adhesive 50 is injected into a region of the frame sealing adhesive 40 corresponding to the contact portion, and a part of the conductive adhesive 50 is extended onto the gate insulating layer 60 corresponding to the light-transmitting portion 31.

The conductive adhesive 50 has conductive particles and has an adhesive ability. The conductive adhesive 50 in the frame sealing adhesive 40 is in contact with the first conductive layer 80, and therefore, the conductive adhesive 50 is electrically connected to the first conductive layer 80. The conductive adhesive 50 is configured to electrically connect with the common electrode of the color filter substrate.

In summary, according to the method of manufacturing the array substrate provided in the embodiment of the present application, by providing the light-transmitting portion 31 in a grid shape in the second common electrode layer 30, the conductive adhesive 50 extending onto the gate insulating layer 60 corresponding to the light-transmitting portion 31 can receive light and thus be cured, and the curing effect is good.

An embodiment of the present application further provides a display device. The display device includes the array substrate of the above embodiment. The display device further includes a color filter substrate and a liquid crystal layer disposed between the array substrate and the color filter substrate. The color filter substrate includes a common electrode. The common electrode and a pixel electrode on the array substrate form an electric field. The display device may be any product or component having a display function, such as a liquid crystal panel, an electronic paper, an organic light-emitting diode panel, a mobile phone, a tablet computer, a television, a display, a laptop computer, a digital photo frame, a navigator, or the like.

The technical features of the above-described embodiments can be combined arbitrarily. In order to make the description concise, all possible combinations of the technical features in the described embodiments are not described. However, as long as the combination of these technical features does not have any contradiction, it should be considered to be the scope of disclosure disclosed in the present description.

The above embodiments merely express several embodiments of the present application, and the description thereof is more specific and detailed, but cannot be construed as limiting the scope of the present invention. It should be noted that, for a person of ordinary skill in the art, several modifications and improvements can also be made without departing from the concept of the present application, which all belong to the scope of protection of the present application. Therefore, the scope of protection of the present application should be regarded by the appended claims.

What is claimed is:

1. An array substrate, comprising:
   a first substrate;
   a first common electrode layer in a grid shape disposed at an edge of the first substrate;
   a second common electrode layer disposed at an inner side the first common electrode layer, comprising a light-transmitting portion in a grid shape, a gate insulating layer being provided on the light-transmitting portion;
   a frame sealing adhesive disposed on the first common electrode layer; and
   a conductive adhesive provided in the frame sealing adhesive and extending partially onto the gate insulating layer corresponding to the light-transmitting portion, the conductive adhesive being configured to electrically connect with a common electrode of a color filter substrate.

2. The array substrate according to claim 1, wherein an area of the light-transmitting portion is greater than or equal to an area of the conductive adhesive on the gate insulating layer.

3. The array substrate according to claim 1, wherein the first common electrode layer is provided with a plurality of first through holes with uniform intervals.

4. The array substrate according to claim 1, wherein the light-transmitting portion is provided with a plurality of second through holes with uniform intervals.

5. The array substrate according to claim 1, wherein the first common electrode layer and the second common electrode layer are disposed along at least three sides of the first substrate.

6. The array substrate according to claim 1, wherein a passivation layer is further formed between the light-transmitting portion and the conductive adhesive; and the gate insulating layer is formed on the second common electrode layer, and the passivation layer is formed on the gate insulating layer.

7. The array substrate according to claim 1, wherein a first conductive layer is further formed between the first common electrode layer and the conductive adhesive, and the conductive adhesive is electrically connected to the first common electrode layer through the first conductive layer.

8. The array substrate according to claim 7, wherein the first conductive layer is an indium tin oxide layer.

9. The array substrate according to claim 7, wherein a cross section of the first common electrode layer is in a gear shape, and a cross section of a side of the first conductive layer contacting the first common electrode layer is provided in a gear shape matching the first common electrode layer.

10. The array substrate according to claim 7, wherein a grid of the first common electrode layer is filled with filled with the gate insulating layer.

11. The array substrate according to claim 1, wherein a gate insulating layer and a passivation layer are formed between the first common electrode layer and the frame sealing adhesive; and the gate insulating layer is formed on the first common electrode layer, and the passivation layer is formed on the gate insulating layer.

12. A display device comprising a color filter substrate and the array substrate as claimed in claim 1.

13. A method of manufacturing an array substrate, the array substrate comprising a first substrate, comprising:
   forming a first common electrode layer and a second common electrode layer on the first substrate respectively, wherein the first common electrode layer is in a grid shape, and the second common electrode layer comprises a light-transmitting portion in a grid shape;
   forming a gate insulating layer on the first common electrode layer and the second common electrode layer, wherein the first common electrode layer comprises a contact portion exposed from the gate insulating layer;
   forming a passivation layer on the gate insulating layer and forming a first conductive layer on the contact portion;
   coating a frame sealing adhesive on a region of the passivation layer corresponding to the first common electrode layer;
   injecting a conductive adhesive into a region of the frame sealing adhesive corresponding to the contact portion, and extending a part of the conductive adhesive onto the gate insulating layer corresponding to the light-transmitting portion.

14. The method according to claim 13, wherein a cross section of the contact portion is in a gear shape, and a cross section of a side of the first conductive layer contacting the first common electrode layer is in a gear shape matching the first common electrode layer.

15. The method according to claim 13, further comprising filling a grid of the first common electrode layer with the gate insulating layer.

* * * * *